Sept. 19, 1933.  J. W. HARDING  1,927,438
BOTTLE BLOWING MACHINE
Filed May 15, 1929   4 Sheets-Sheet 1
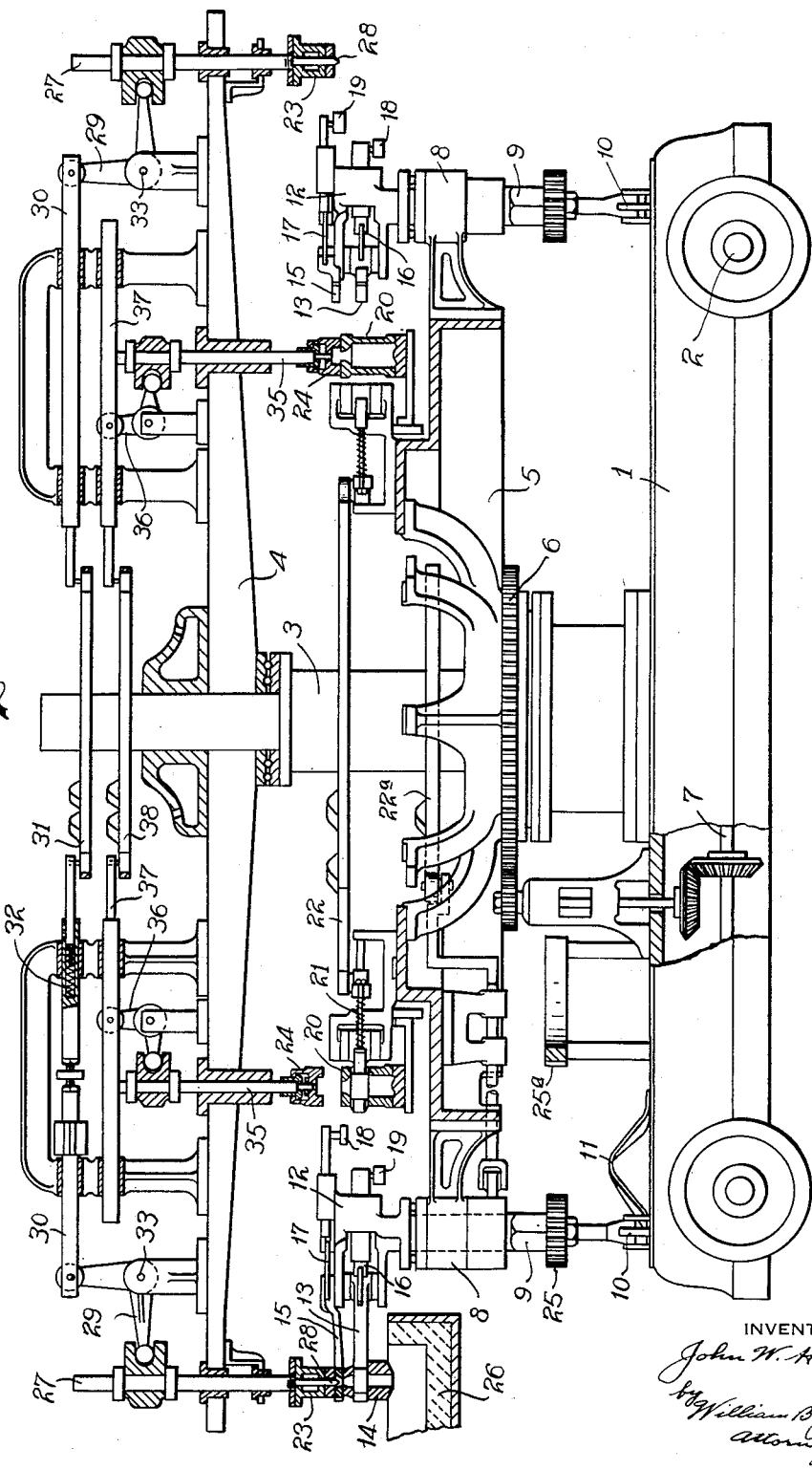
INVENTOR
John W. Harding
by William B. Jaspert
Attorney.

Sept. 19, 1933. J. W. HARDING 1,927,438
BOTTLE BLOWING MACHINE
Filed May 15, 1929 4 Sheets-Sheet 2
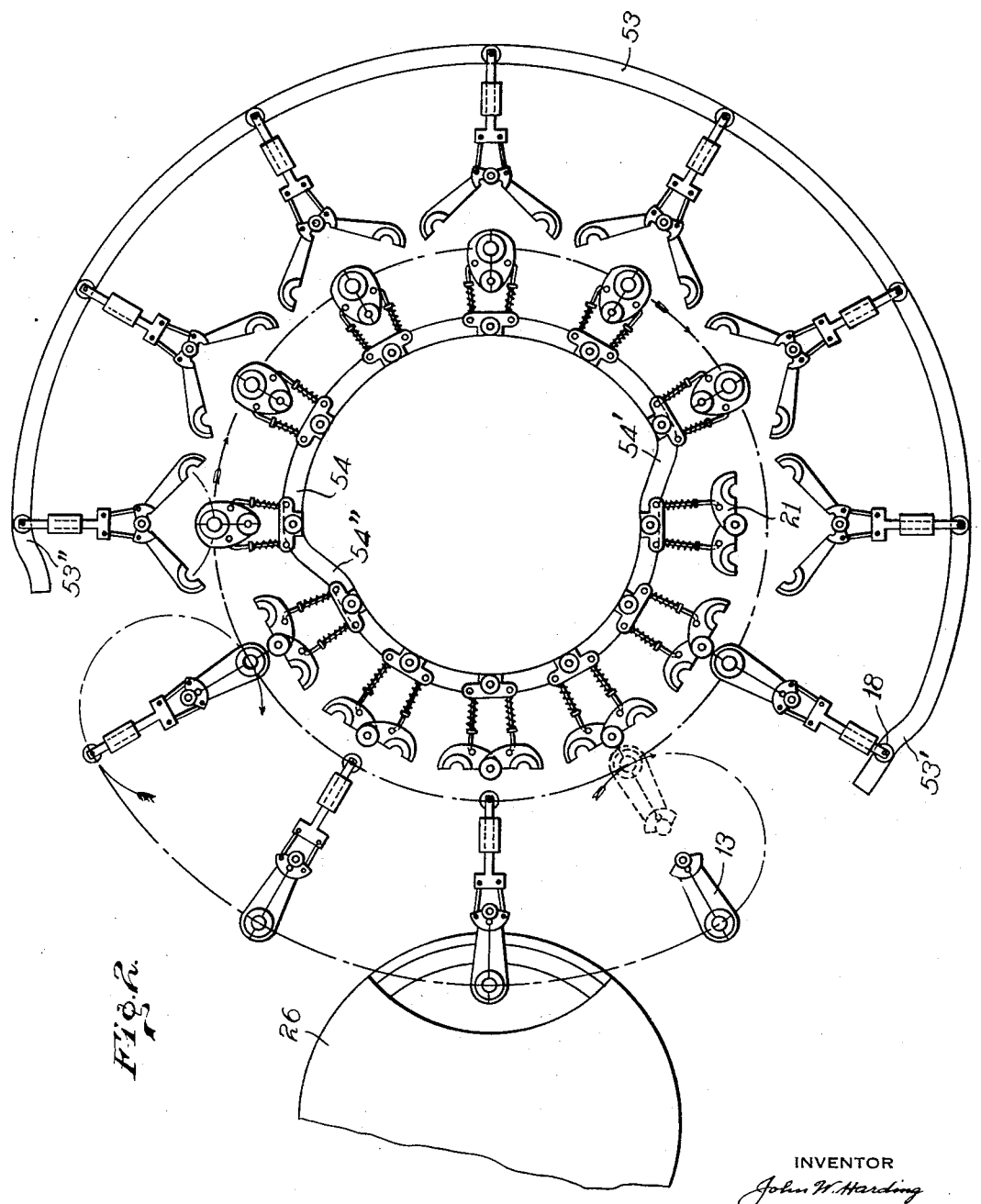

Sept. 19, 1933.   J. W. HARDING   1,927,438
BOTTLE BLOWING MACHINE
Filed May 15, 1929    4 Sheets-Sheet 3
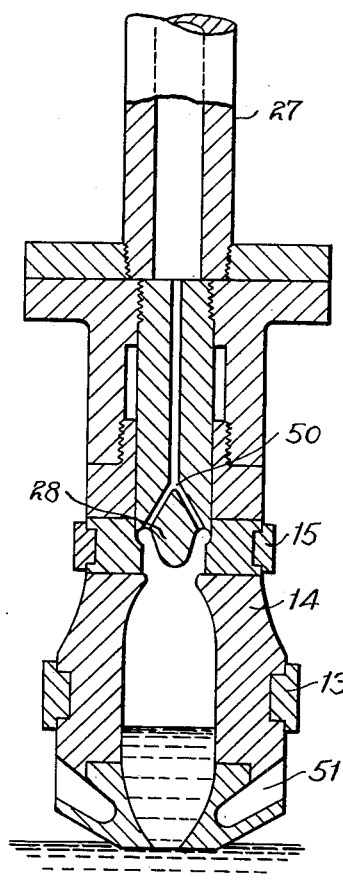
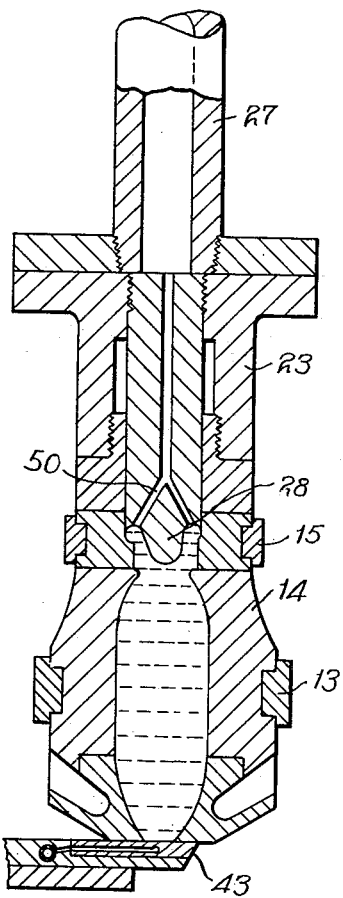
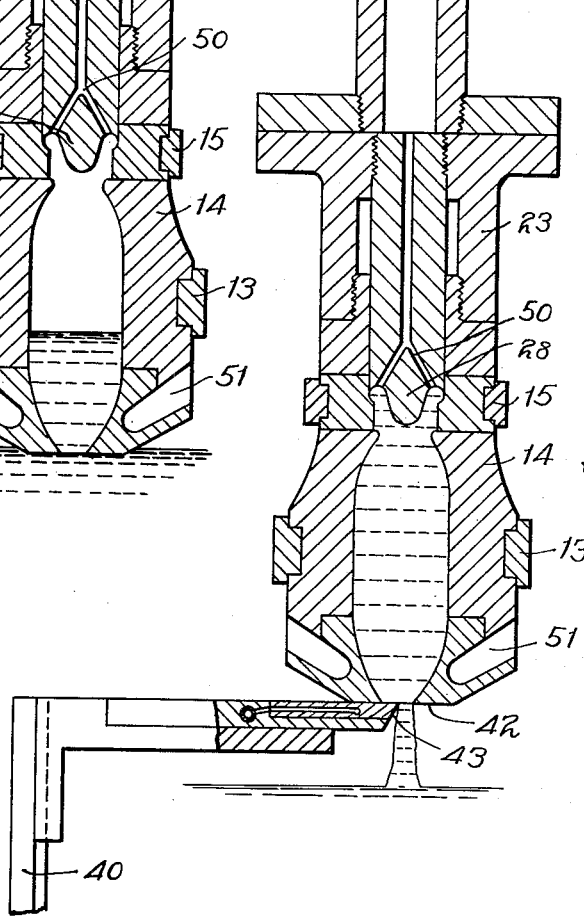
INVENTOR
John W. Harding
by William B. Jaspert
Attorney.

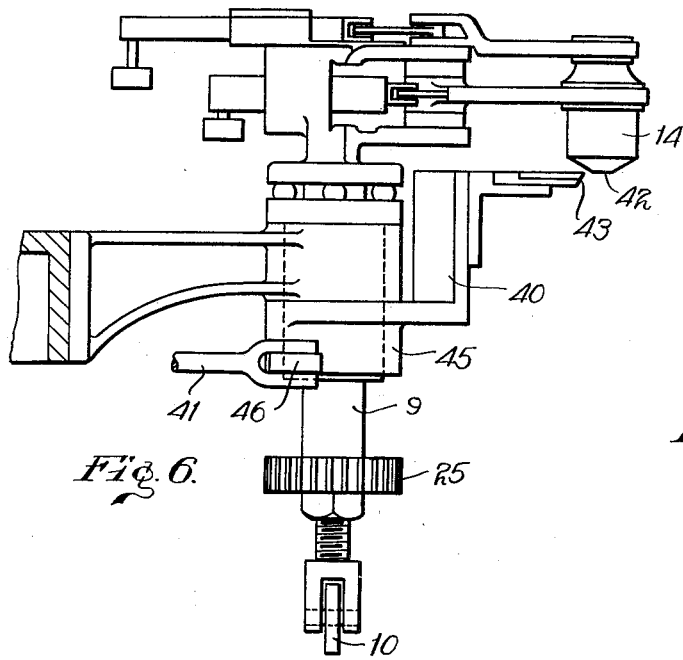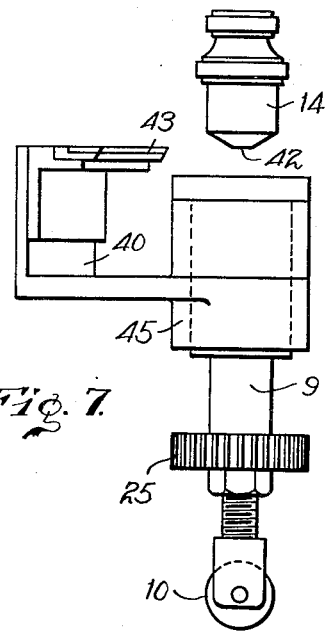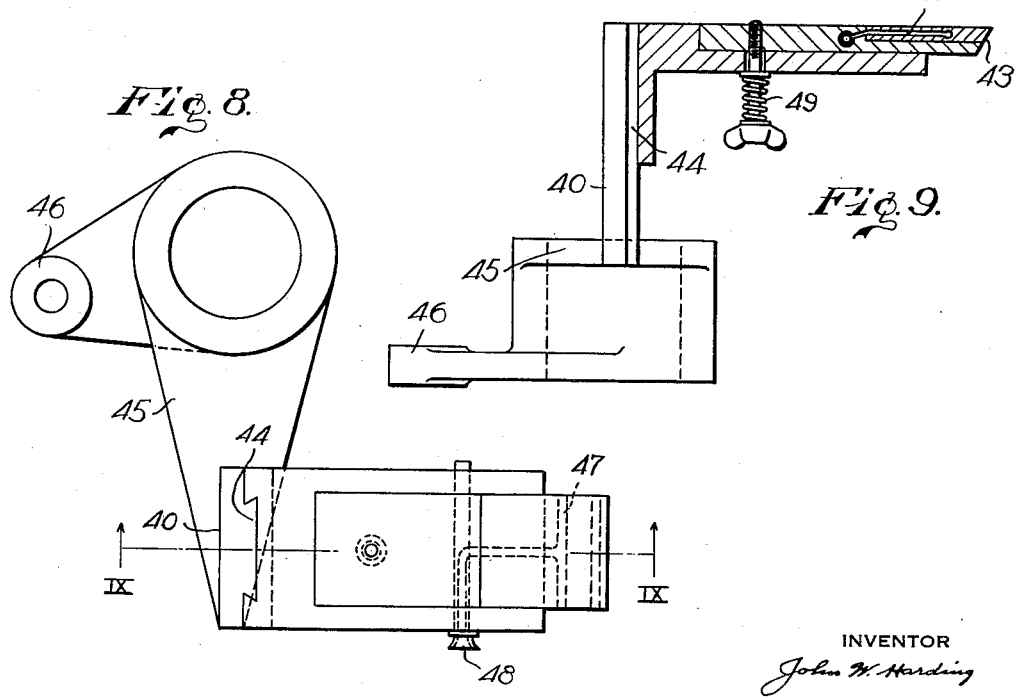

Patented Sept. 19, 1933

1,927,438

UNITED STATES PATENT OFFICE 1,927,438

BOTTLE BLOWING MACHINE

John W. Harding, Brockway, Pa.

Application May 15, 1929. Serial No. 363,175

4 Claims. (Cl. 49—5)

The present invention relates to improvements in apparatus for the manufacture of hollow glassware but more especially to improvements in machines for forming glassware in which the molten glass is drawn by means of suction into a mold and subsequently transferred to a finishing mold.

It is among the objects of this invention to provide a machine in which the parison molds are passed over a working tank, lowered into contact with the glass surface of the tank and subsequently lifted out of contact with the contents of the mold then transferred to a finishing mold.

A further object of the invention is the provision of a machine of the above designated character which shall be of simple mechanical construction, which shall be operated in a manner to have the glass forming units co-ordinated with the rotation of the machine to carry out the several functions of drawing a charge of glass into the mold; forming the neck portion of the glassware; transferring the charge to a finishing or blow mold, and subsequently discharging the finished ware from the machine.

These and other objects will become more apparent from a consideration of the accompanying drawings in which like reference characters designate like parts and in which Fig. 1 is a sectional elevational view of a glass blowing machine embodying the principles of this invention; Fig. 2 a top plan view thereof illustrating the cooperative position of the machine and eliminating the major portion of the operating mechanism for the sake of clarity; Figs. 3, 4 and 5 are vertical sectional views of the parison mold, the neck ring and plug structure, with a portion of the suction mechanism; Fig. 6 is a side elevational view of the swivel mechanism, links and levers, together with the shearing mechanism comprising a portion of the glass forming unit; Fig. 7 is a front elevational view of the mechanism shown in Fig. 6; Fig. 8 is a top plan view of the shear and its actuating lever; and Fig. 9 is a sectional elevational view of the member illustrated in Fig. 8.

With reference to Fig. 1 of the drawings, the structure therein illustrated comprises a base 1 journalled on wheeled axles 2, whereby it is rendered movable, and having a center column 3 carrying an upper and lower rotating frame 4 and 5 which are connected by up-rights (not shown) to be jointly rotatable. The frame members are rotated through gear connections 6 with the gear spindle 7 that may be operated by a motor or any suitable prime mover.

The lower frame 5 carries a plurality of bearing brackets 8 in which are journalled pivot members 9 which are supported by rollers 10 on a cam track 11. The member 9 carries a head 12 having levers 13 constituting clamps for engaging a parison mold 14. The member 12 further carries levers or neck ring holders 15 and both sets of levers 13 and 15 are open and closed through links 16 and 17 connected to cam followers 18 and 19.

In radial alinement with the glass feeder units are a plurality of finishing molds 20 operated by levers 21 by means of which they are opened by an inside cam 22 which rotates with the lower frame 5. The blow molds are rotatable with the parison molds and similarly a suction head 23 and a blowing head 24 are angularly movable by rotation of the upper frame 4.

The pivot member 9 is rotated by a gear 25 and segment 25a, the gear 25 travelling in the path of the segment rack 25a that is stationary with the supporting base 1. When the teeth of the gear wheel 25 engage the teeth of the rack 25a, member 9 is rotated in the manner shown in dotted lines and arrows in Fig. 2 of the drawings to swing the parison molds 14 through an arc of 180° to change their inner position from alinement with the blow molds to an extreme outer position in which they are in alinement with a glass feeding or working tank 26.

As the parison molds are brought into alinement with the working tank 26, the roller 10 passes over the cam 11 thereby raising the mold from its normal operating plane to clear the edge of the tank and subsequently lower the same into contact with the molten glass after which the roller 10 passes over another cam 11 whereby the parison mold is raised out of the working tank and again lowered to its normal position for cooperation with the blow molds.

As the lower frame continues to revolve, the gear elements 25 will strike another segment gear 25a and rotate 180° to bring the charged molds 14 in cooperative alinement with the blow molds 20.

When the parison mold 14 delivers its charge to the finishing mold 20, the suction head 23 and the neck forming plunger 28 are raised out of contact with the mold by means of the following mechanism:—The suction head and rods 23 and 27 are vertically movable by means of a bell crank 29 having connections with a link 30 that is operated through a cam 31. By virtue of the cam follower passing over the face of the cam against which it is urged, by a spring 32, the bell crank 29 will be pivoted on its support 33, whereby the rod 27 and suction head 23 are subjected to vertical movement. On account of the loose connection of link 30 with its cam follower, the suction head and spindle are free to move vertically in response to vertical movement of the molds 14 when the latter are raised and lowered, in passing over cams 11 and in rendering the suction head movable through the crank 29 and cam 31 independently of the movement of the molds 14, all the joints of the suction head, molds and neck rings being relieved of stress.

In the operation of the blow molds 20 the blowing head 24 is raised or lowered on the mold through the rod 35 having a bell crank connection 36 with a link 37 that is oscillated by cam 38 so that the blowing head is raised and lowered at the proper time when the charge of the parison mold is transferred to the blow molds for finishing.

As shown in Figs. 6 and 7, the shearing mechanism generally designated at 40, is pivotally mounted on the member 9 and actuated through link 41 to swing in an arc embracing the lower portion 42 of the parison mold. The mechanism is provided with a shearing member 43 which as shown in Fig. 8 is secured by a dovetail joint 44 to a bell crank lever 45 which is pivotally connected at 46 to the link 41. The shearing mechanism is further provided with grooves or orifices 47 for circulating a cooling medium which is provided through flexible connections at the inlet 48. The shearing blade 43 is secured to its support by a spring biased screw 49 to yieldingly hold it in position whereby it is permitted to yield to prevent breakage or damage in the event that it contacts with the suction mold.

In Figure 3 the parison mold is shown in the position of receiving its charge. In Figure 4 it is shown raised above the glass pool and at the initiation of the shearing operation, whereby the attenuated glass is cut from the bottom of the mold, and in Figure 5 it is shown completely charged. In these figures of the drawings, the neck forming plunger 28 is shown as provided with ducts 50 for circulating the cooling medium and the mold is shown as having deep cut out portions 51 adjacent its lower end to provide a relatively large heat radiating surface for cooling the molds, particularly that portion which contacts with the glass pool in the working tank.

When the charged mold has been transferred to the position in alinement with the blow molds, the molds are opened by an outer cam 53 and at the same time the blow molds are closed by an inner cam 54. The blow head 24 is then lowered on the finishing mold and the glass blown to the shape of the mold, when the latter is again opened by its cam 54 and the articles discharged from the machine.

The air for blowing and suction purposes is controlled by valves operated by electric solenoids or by inner cams and lever mechanisms in a well known manner and not illustrated in the drawings. Similarly, cooling medium may be circulated through the heated parts of the machine in an obvious and well known manner.

The operation of this device is briefly as follows:—The center column 3 and the upper and lower frames 4 and 5 carrying the molds 20 and 24 are rotated through the drive gear 6 and 7 and the cams remain stationary. When the follower 18 passes the off-set portion 53', of cam track 53, the neck ring 15 closes and gear wheel 25 of member 9 strikes the stationary rack 25a and turns 180° as indicated in dotted lines, Fig. 2. Follower 10 of the mold support then passes over cam track 11 causing molds 14 to rise in approaching working tank 26, then to lower, bringing the mold in contact with the glass pool. The suction head 23 by virtue of its bell crank 29 and link connection 30 will simultaneously be raised and lowered by cam 31 following the vertical movements of mold 14.

When molds 14 are in contact with the glass pool in tank 26, the glass is sucked into the molds and by further rotary motion of frame 5 the mold is raised from the pool by cam track 11 and swung into alinement with the blow molds 20. As the mold is withdrawn, the attenuated glass at the bottom of the molds is sheared off by shear 43 which is actuated through its lever 45 and linkage operated by cam 22a. By further angular movement of the molds 14, they are again lowered to the level of the finishing molds 20 and when the follower 18 passes off-set portion 53" of cam track 53, the suction mold opens and the finishing mold closes simultaneously by virtue of off-set 54" of cam track 54.

Simultaneously with the transferring of the charge from the parison molds to the finishing molds, the suction heads 23 are lifted off the suction molds in the manner described above and the blow heads 24 are lowered to the finishing molds. The glass is blown to the shape of the finishing mold in passage from 54" to 54' on cam track 54 when the article will be discharged and the cycle of operation again repeated.

It is evident from the foregoing description of this invention that blowing machines made in accordance therewith are adapted to form glass articles in a simple and inexpensive manner and that such apparatus is extremely simple of construction and operation. Also, the molds may be of any height or size for the manufacture of different shaped articles.

Although one embodiment of the invention has been herein illustrated and described, it will be obvious to those skilled in the art that various modifications may be made in the details of construction without departing from the principles of this invention, herein set forth.

I claim herein as my invention:

1. In a glass blowing machine the combination with a rotatable frame carrying a plurality of parison molds and finishing molds, the latter operating in a fixed horizontal plane, of a second frame rotatable with said first named frame having a plurality of suction devices and blowing devices maintained in vertical alinement with said parison and finishing molds respectively, means affected by movement of said first named frame for raising the parison molds, swinging them to charging position, and again lowering said molds to their normal position in cooperative alinement with the finishing molds, and means affected by movement of said second frame for lowering and raising said suction and blowing devices into and out of engagement with said parison and finishing molds.

2. In a glass blowing machine the combination of a rotatable frame carrying a plurality of parison molds mounted for vertical movement in said frame and carrying a plurality of finishing molds movable in a fixed horizontal plane, a cam track in the path of movement of said parison molds and a gear rack in cooperative relation with said cam track for engaging gear wheels for swinging said parison molds as they approach and run off of the cam tracks, a second frame carrying a plurality of suction and blowing devices movable with said first named frame and adapted for vertical movement in timed relation with the swinging movement of said parison molds, and means in the path of movement of said second named frame for connecting said parison and finishing molds with a source of vacuum and pressure respectively.

3. In a glass blowing machine, the combination of a pair of rotatable frames in superposed relation, the bottom frame carrying a plurality of parison, neck and finishing molds, and the top frame carrying suction and blowing devices for said molds, a plurality of stationary cams in the path of movement of said molds and blowing devices, means for swinging said parison and neck molds through an arc of 180°, and means for lifting said molds during a portion of their travel, means for lowering said suction devices to said neck and parison molds while in their raised position, and means for swinging said neck and parison molds 180° to their original position to deposit the parisons in the finishing molds.

4. In a glass blowing machine, the combination with a pair of rotatable frames rotating in a fixed vertical plane, a plurality of parison, neck and finishing molds mounted on the lower frame, and a plurality of suction and blowing devices corresponding in numbers to said parison and finishing molds mounted on the upper frame, means for actuating said suction and blowing devices to subject them to vertical movement relative to said upper frame, and cams in the path of movement of said actuating means for rendering said suction and blowing devices operative in relation to the movement of the molds, said parison molds being adapted for swinging movement about their axes and being adapted for vertical movement in their supporting frames, movement of said parison molds being at predetermined relation with the movement of the suction devices, and cams disposed in the path of movement of the finishing molds to open and close said molds in predetermined relation with the vertical movement of said blowing devices.

JOHN W. HARDING.